US006226665B1

United States Patent
Deo et al.

(10) Patent No.: US 6,226,665 B1
(45) Date of Patent: *May 1, 2001

(54) APPLICATION EXECUTION ENVIRONMENT FOR A SMALL DEVICE WITH PARTIAL PROGRAM LOADING BY A RESIDENT OPERATING SYSTEM

(75) Inventors: Vinay Deo, Bellevue; Michael John O'Leary, Redmond; Robert B. Seidensticker, Jr., Woodinville, all of WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/825,645

(22) Filed: Apr. 3, 1997

Related U.S. Application Data

(60) Provisional application No. 60/025,748, filed on Sep. 19, 1996.

(51) Int. Cl.[7] .............................. G06F 9/445; G06F 9/06; G06F 9/40; G06F 15/177
(52) U.S. Cl. ......................... 709/106; 709/102; 709/318; 717/11
(58) Field of Search .................................... 395/682, 670, 395/672, 712, 676; 709/312, 318, 102, 106; 717/11; 705/106

(56) References Cited

U.S. PATENT DOCUMENTS 4,320,451 * 3/1982 Bachman et al. .................... 709/313
5,197,148 * 3/1993 Blount et al. ............................ 714/5

(List continued on next page.)

FOREIGN PATENT DOCUMENTS

05265440 * 4/1995 (JP) ................................. G06F/9/445
7-105011 * 4/1995 (JP) ................................. G06F/9/445

OTHER PUBLICATIONS

Rowe, M. "Memory Management for Portable Computers", Hewlett–Packard Journal, v. 37, n. 7, pp. 21–25, Jul. 1986.*

(List continued on next page.)

*Primary Examiner*—Mark R. Powell
*Assistant Examiner*—Jeffrey Allen Rossi
(74) *Attorney, Agent, or Firm*—Ronald M. Anderson

(57) ABSTRACT

Small application programs called "applets" are defined by pseudo-code (p-code) instructions. Each applet is divided into software components that are executed by a processor, operating as a state machine. The applets are originally written in a high level programming language and then converted into the p-code, for downloading into a non-volatile read/write memory of a portable combination pager and personal information manager (PIM) device that includes the processor. In this device only 1–2 Kbytes of static random access memory (RAM) are available to load the p-code of applets for execution by the processor. The software components include variables and event handlers that respond to events such as key presses of buttons disposed on a control panel of the device. The variables include persistent variables that are stored in memory between invocations of an applet, invocation variables that are store in RAM during execution of an applet, and state variables that are only stored in RAM during a specific state of the applet. Event variables are available for processing of a specific event, but are replaced by different event variables when a different event must be processed. A kernel comprising a portion of the operating system for the device serves as a p-code interpreter, producing machine instructions from the p-code loaded into RAM, for execution by the processor. Accordingly, applets, which comprise only a few kilobytes of p-code, are executed by loading only a few of the software components into RAM at a time.

34 Claims, 4 Drawing Sheets

U.S. PATENT DOCUMENTS

| | | | |
|---|---|---|---|
| 5,305,454 | * 4/1994 | Record et al. | 709/318 |
| 5,355,484 | * 10/1994 | Record et al. | 717/4 |
| 5,367,683 | * 11/1994 | Brett | 717/9 |
| 5,430,861 | * 7/1995 | Finn | 711/112 |
| 5,596,752 | * 1/1997 | Knudsen et al. | 717/1 |
| 5,659,798 | * 8/1997 | Blumrich et al. | 710/26 |
| 5,717,927 | * 2/1998 | Bergler et al. | 709/106 |
| 5,721,920 | * 2/1998 | Mak et al. | 709/102 |
| 5,754,306 | * 5/1998 | Taylor et al. | 358/400 |
| 5,754,817 | * 5/1998 | Wells et al. | 711/203 |
| 5,774,729 | * 6/1998 | Carney et al. | 717/8 |
| 5,794,049 | * 8/1998 | Lindholm | 717/6 |
| 5,838,969 | * 11/1998 | Jacklin et al. | 709/318 |
| 6,170,049 | * 1/2001 | So | 712/35 |

OTHER PUBLICATIONS

Suzuki, Kazauo, "Puroguramu Roodo Hoohoo (Program Loading Method)", translation of JP 07–105011, By FLS, Inc., Washington DC, pp. 1–16, Apr. 1999.*

May et al., "Personal Applications Manager for HP Portable Computers", Hewlett–Packard Journal, v. 37, n.7, pp. 18–21, Jul. 1986.*

Armand, Francois et al., "Multi–threaded Processes in CHORUS/MIX", Proceedings of EEUG Spring '90 Conference, Munich, pp. 1–13, 4/1990.*

Tanenbaum, Andrew S., "Modern Operating Systems", New Jersey: Prentice Hall, ISBN 01–13–588187–0, pp. 42–48, 1/1992.*

Brockschmidt, Kraig. "Inside OLE 2", Redmond: Microsoft Press, ISBN 1–55615–618–9, pp. 29–33, 1/1994.*

Rao, Paddy et al. "Partitioning Key to modular–set–top design", Electronic Engineering Times, No. 900, pp. 50–5 (reprinted as pp. 1–3), 5/1996.*

Fryer, Kim, ed. "Microsoft Press Computer Dictionary: third edition", Redmond: Microsoft Press, ISBN 1–57231–446–X, pp. 268–269, 01/1997.*

* cited by examiner

APPLICATION EXECUTION ENVIRONMENT FOR A SMALL DEVICE WITH PARTIAL PROGRAM LOADING BY A RESIDENT OPERATING SYSTEM

RELATED APPLICATION

This application is a continuation-in-part of prior copending provisional Application Ser. No. 60/025,748, filed Sep. 19, 1996, the filing date of which is hereby claimed under 35 United States Code Section 119(e).

FIELD OF THE INVENTION

The present invention generally relates to a microcomputer for executing software applications, and more specifically, pertains to an environment for executing software applications so as to require only a relatively small amount of volatile memory, compared to an overall size of the program code that comprises the application.

BACKGROUND OF THE INVENTION

On the first personal computers (PCs) developed by IBM, the operating system and applications executed were relatively compact, sharing about one megabyte of address space. PCs including desktop and portable laptop computers have subsequently evolved to much more sophisticated designs. Graphic operating systems and applications requiring much more memory have become common, and it is not unusual for PCs and laptop computers to be sold with 16 or more megabytes of random access memory (RAM) installed. In contrast to the increasing amount of RAM installed on PCs, portable personal information (PIM) devices have recently been introduced that include a microcomputer or microprocessor provided with only enough RAM to enable the dedicated PIM functions to be performed. PIM devices must be distinguished from personal, data assistants (PDAs) that include sufficient RAM to enable small application programs specifically developed for the PDA to be executed. PIM devices provide very limited computational functions, and much of the functionality of the devices is programmed into read only memory (ROM). RAM is typically not provided on a PIM device for running application programs that are downloaded into non-volatile read/write memory. An example of a PIM device is the Timex DATA LINK™ wristwatch, which provides timekeeping functions and stores PIM data that are downloaded from a PC through a sensor that responds to a predefined modulation of scan lines on the PC monitor.

Data can be downloaded into a non-volatile read/write memory of a portable computing device such as a lap top computer from a conventional PC using a variety of different mediums, including: radio frequency (RF) links, infrared data links, and data cable connections. In addition to the screen modulation technique noted above, these same data transfer mediums can be employed to download data into a portable PIM device. A PC is preferably used for compiling/entering the data, since the keyboard of the PC permits more efficient data entry, the hard drive of a PC conveniently provides long term storage, and data are more easily reviewed on the PC display. Application programs are not normally downloaded to a PIM device from a PC, because the 2–4 Kbytes (or less) of RAM provided on the typical PIM device is generally considered too small for executing downloaded code.

More recently, however, a combination pager and PIM device has been developed that will receive conventional paging messages and paging objects that are used to update PIM data and other data maintained in non-volatile read/write memory in the device. The data stored in the device includes the typical PIM type of data noted above, e.g., addresses, telephone numbers, and names. However, the design specification for this dual purpose paging device requires that it also be capable of executing small application programs called "applets" using the very limited amounts of RAM provided on the device, i.e., typically less than 4 Kbytes. Those familiar with programming applications for execution by a microprocessor will appreciate that with even the most careful and efficient coding, it is generally not possible to implement more than a trivial application with machine instructions that will fit into 4 Kbytes of RAM. Accordingly, a new approach is required that will enable processing of larger amounts of application code in a very limited amount of RAM.

Another facet of the problem is that the machine instructions comprising an applet must be written in very efficient format that is optimized for the limited memory environment in which the applet will be executed. Processing programming language instructions with a software interpreter has been used on PCs in the prior art to manage the size of application programs. An example of an interpreter for use in a limited processing environment is the BASIC STAMP™ circuit, which is a single integrated circuit that includes an embedded BASIC language interpreter. However, the use of an integrated circuit to facilitate an interpreter is not particularly useful in the present case, because it would increase the cost of the device to an unacceptable level. Also, the interpreter circuit produces machine language instructions, and too much RAM would be required to store and run the machine language instructions produced by the interpreter circuit. Instead, the microcomputer should be able to execute applications written in a different form that is tuned to the limited processing environment of the device. The code should include short instructions that represent more complex computations and algorithms, thereby keeping the size of the applets extremely small and within the constraints of the memory and capabilities of the processing environment. Further the code loaded into RAM when an applet is executed should preferably be processor independent.

SUMMARY OF THE INVENTION

In accordance with the present invention, a method is defined for executing a software application on a system having a processor so as to minimize a RAM capacity required while the processor executes the software application. The method includes the step of providing application code that is divided into specific software components. The software components include variables and an event handler. A first portion of the variables and the event handler for the software application are loaded from a storage memory that is not used for execution of the application, into a RAM of the system and are executed from the RAM using the processor. Any change in a state of the system and any new event is detected by the processor while it executes the software components loaded into the RAM. In response to either a change in the state of the system or a new event, another software component is loaded into the RAM for execution by the processor, replacing at least one of the software components previously loaded. These steps repeat until execution of the software application is terminated.

Several different types of variables are employed, including a persistent variable that is retained between invocations of the software application; an invocation variable that is stored in the RAM during execution of the software application and retained between changes in state of the system, but lost when the software application terminates; a state variable that is stored in the RAM during processing of a specific event, but replaced when the system changes state; and an event variable that is stored in the RAM while an event is being processed; but replaced by a new event variable when a different event must be processed. Any of the variables except the event variable are able to have an initial value when loaded into the RAM. If a new event occurs while the system has not changed state, the event variable and an event handler for the new event are loaded into the RAM, replacing a previously loaded event variable and event handler. If a new event occurs when the system has changed state, the state variable, the event variable, and the event handler for the new event are loaded into the RAM, replacing a previously loaded state variable, event variable, and event handler. An operating system kernel specifies an order in which the variables are loaded into the RAM during execution of the software application by the processor. The kernel thus ensures that required software components are loaded when needed, but that the storage capacity of the RAM is not exceeded.

A main entry routine is initially executed by the processor when a software application is invoked by the user. The main entry routine implements at least one task (such as displaying the applet title) before an event is processed by the processor. A common code software component (optional) comprises a routine that is executed by a plurality of different event handlers loaded into the RAM at different times while the software application is being executed by the processor. Only a portion of the RAM is used for storing software components that comprise the software application.

A further aspect of the present invention is directed to a system for executing a software application in a limited memory environment. The system includes a processor that executes pseudo-code (p-code) comprising the software application. The p-code has a plurality of software components, including variables and an event handler. A storage memory is provided for storing the p-code until the software application is invoked by a user of the system and for storing machine language instructions that determine how the processor interprets and processes the p-code. The system also includes RAM having a storage capacity smaller than that required to hold all of the p-code comprising the software application when executed by the processor. The processor responds to machine instructions stored in the non-volatile memory to implement functions that are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 4:
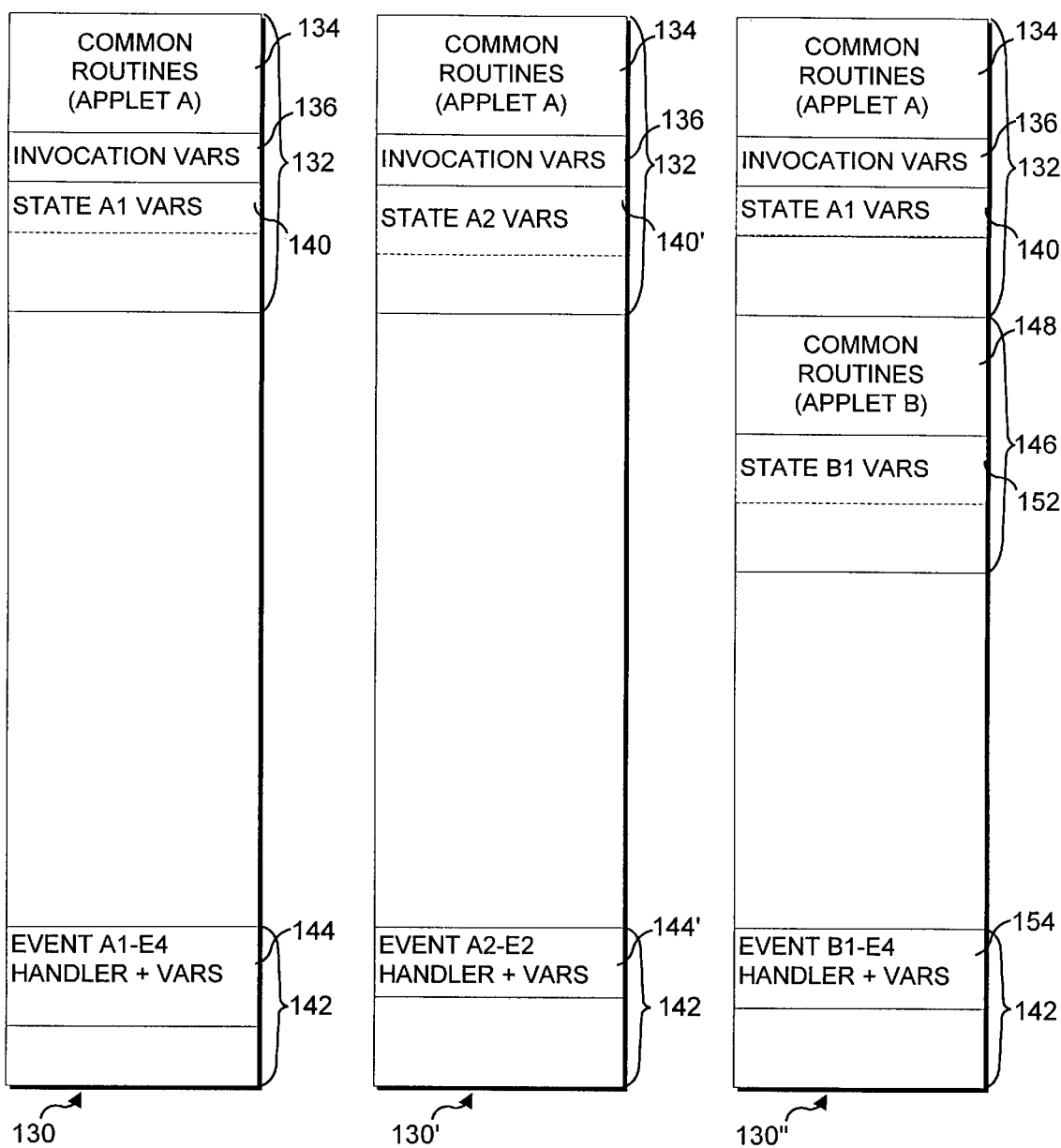
Figure 5:
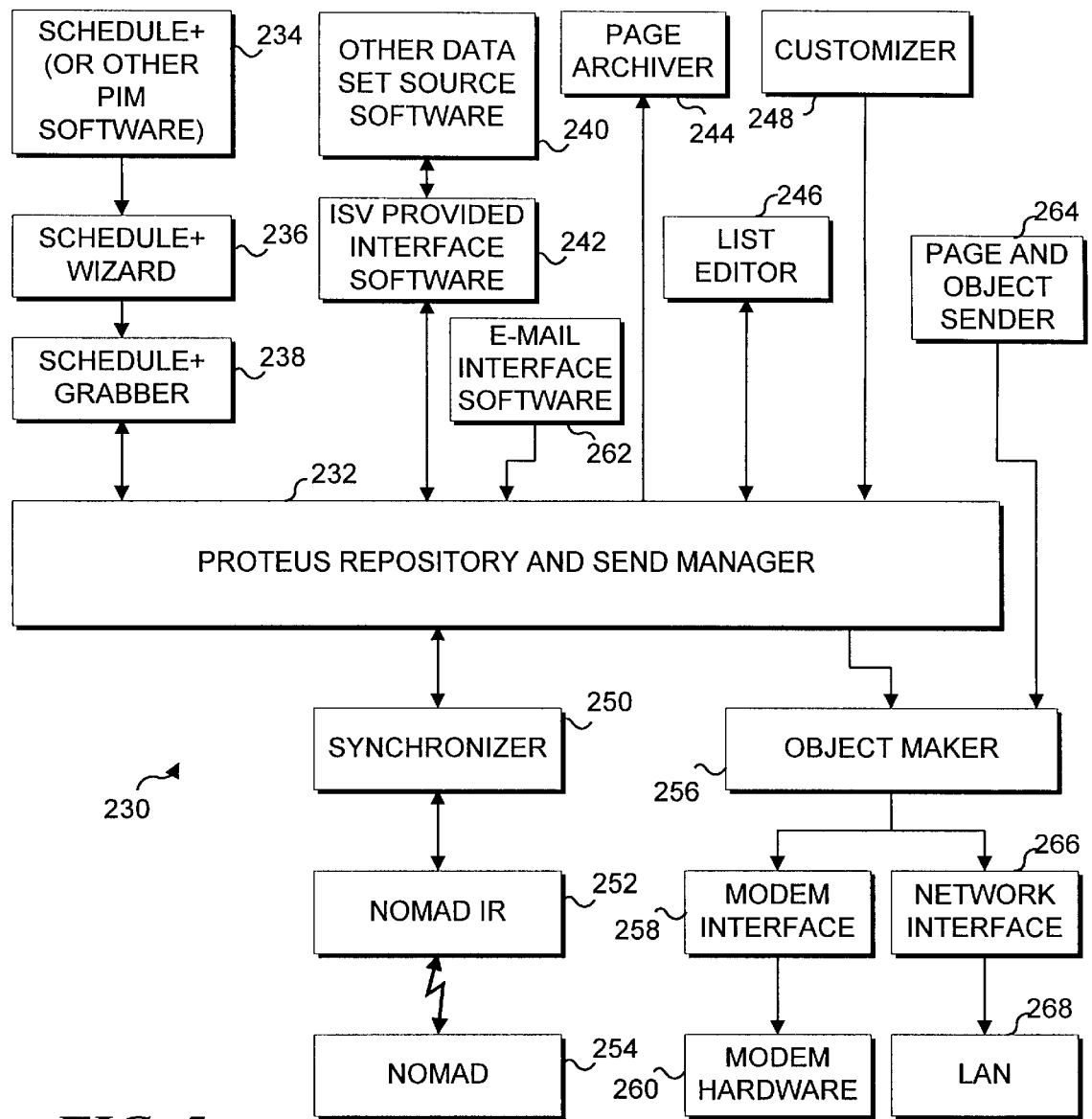

FIGS. 4A, 4B, and 4C are block diagrams respectively illustrating first and second states for an applet A, and a starting state for an applet B, showing how changes occur in the memory allocation for each condition; and FIG. 5 is a block diagram showing the functional components of the software executed on a PC to load data into Nomad.

DESCRIPTION OF THE PREFERRED EMBODIMENT

A preferred form of the present invention is embodied in a combination pager and data management device, which is referred to herein by the project name "Nomad." However, it is contemplated that the present invention can also be practiced using other readily portable electronic devices having a limited memory and resources for executing application software. For example, a combination cellular phone and data management device employing the present invention would achieve virtually all of the benefits and advantages of the present invention that are realized in Nomad. Such devices will have enhanced utility compared to existing portable PIEIN devices and other portable electronic devices, and the functions and compact size of such devices will more likely encourage the user to carry the device at all times. Accordingly, it is not intended that the scope of the present invention be limited by the disclosure of the invention as embodied in an exemplary pager and PIM device.

User Interface

Figure 1:
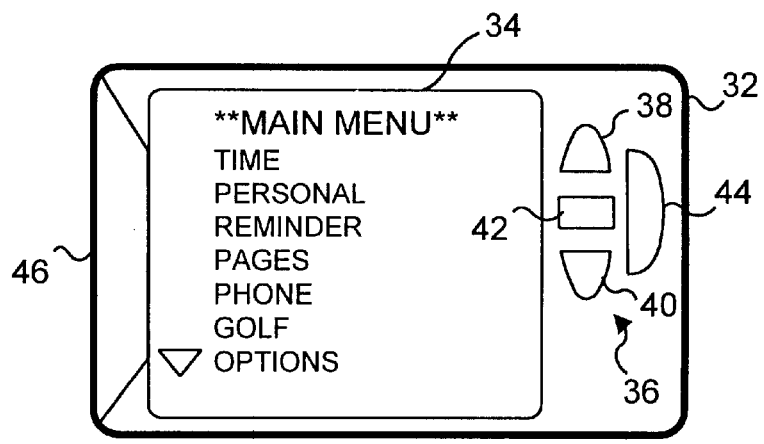
FIG. 1 is a plan view of a combined pager and data management device embodying the present invention (referred to herein as "Nomad")

A top view of a Nomad pager and data management device 30 is shown in FIG. 1. Nomad includes a housing 32 and has a user interface that includes a keypad 36 disposed on the top of housing and having four buttons that are used to control the display and the functions performed by Nomad in connection with its conventional paging function and its PIM data management functions. The buttons comprise an Action button 42, a Back button 44, an Up button 38, and a Down button 40. The buttons navigate the user through a directory/menu hierarchy like that shown in FIG. 1. The Action/Back buttons are paired as opposites, having a pair functionality similar to that of the Enter and Escape keys on a conventional QWERTY keyboard. The Action button takes the user in (to a selected lower level) and the Back button takes the user out (to a next higher [or parent] level in a the hierarchical structure). The Up/Down buttons are another functional pair of buttons that move the user up and down within a display 34. Display 34 is preferably a liquid crystal display (LCD), which in the preferred embodiment can display a maximum of eight lines, with 17 characters per line. Other types and sizes of displays can alternatively be used, as appropriate for the type of device in which the present invention is included.

Figure 2:
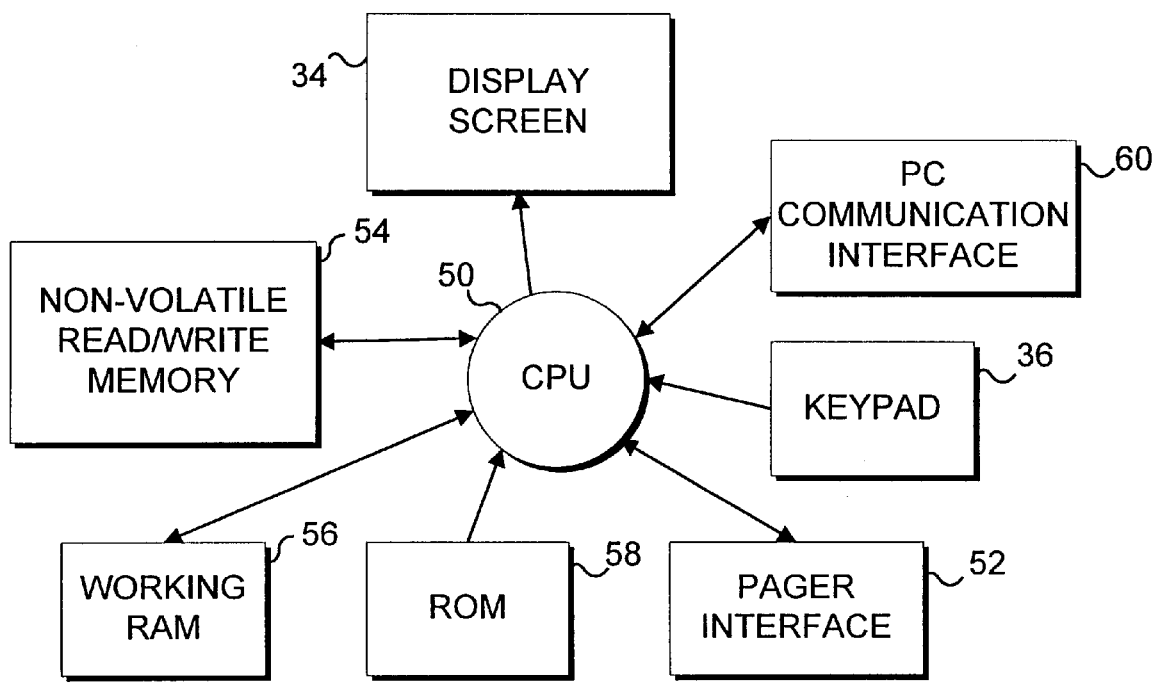
FIG. 2 is a schematic functional block diagram of Nomad.

Referring now to FIG. 2, a block diagram illustrates the functional components comprising Nomad. An eight-bit central processing unit (CPU) 50 implements the software controlled functions performed by Nomad, although it will be understood that CPUs employing either more or fewer bits can alternatively be employed. CPU 50 is coupled to display 34 so that text and graphic icons generated in accord with the controlling software appear on the display. Data that are downloaded or entered by the user into Nomad are stored in a non-volatile read/write memory 54, and this memory is bidirectionally coupled to the CPU, which reads and writes the data in a serial stream. In the preferred embodiment, the CPU is preferably a Motorola Corporation, type Z80™ running at from 2–4 MHz. The capacity of non-volatile read/write memory 54, which is provided on an electrically erasable programmable read only memory (EEPROM) circuit, is only about 8 Kbytes in the preferred embodiment. A working (static) random access memory (RAM) 56 has a capacity of about 4 Kbytes in the preferred embodiment and is also coupled bidirectionally to the CPU. The RAM provides volatile storage for instructions that are executed by the CPU when applets are run on Nomad, and storage for temporary data, such as register values. Default values for configuration options and other variables are stored in a ROM 58, which has a capacity of only about 10–20 Kbytes. The ROM is also used to store the operating system software for the device that controls the basic functionality of Nomad, e.g., its conventional paging function and other operating system kernel functions, e.g., the loading of applet software components into RAM.

From the preceding description, it will be apparent that size of the code defining an applet must be less than the 8 Kbyte capacity of non-volatile read/write memory 54, since this memory simply serves as storage for the code in a manner analogous to the function of a hard drive on a PC that is used to store application programs, i.e., storing the applet code until the applet is required to be executed by a user. It should be noted that although non-volatile is preferably used for storing the applet code, it can alternatively be stored in a volatile memory that is not used for execution of the code. Further, if more than one applet is stored in this storage memory (non-volatile or volatile), the total size of the code for all such applets must be less than the capacity of the storage memory. The applets are written in compact p-code, which allows them to be extremely small in size compared to more conventional application programs written to be executed on PCs. It will also be apparent that only a portion of the p-code for an applet that is larger than the 1–2 Kbytes of RAM available for applet execution from the 4 Kbytes of the system's working memory 56 can be loaded into RAM from the non-volatile read/write memory at one time, for execution by CPU 50. The p-code is processor independent, since the operating system for a specific type of processor can translate the p-code into the required machine instructions needed for that type of processor.

The present invention divides the p-code into modules or software components. Operating as a state machine, specific modules of p-code are swapped into the RAM of Nomad for execution by the CPU so that an extremely small run-time footprint in memory is required when executing an applet. Further details of this technique are discussed below.

Paging signals received by Nomad are handled through a pager interface 52, which is coupled to CPU 50. As already noted, keypad 36 provides a simple user interface to permit control of the device, editing, and other user determined selections entered with the four buttons. Since the data stored in non-volatile memory 54 are likely to be more extensive than a user would care to enter using only the four buttons, such data are more efficiently entered on a PC (not shown) and downloaded to Nomad through a PC communication interface 60. Preferably, this interface comprises an infrared (IR) sensor/transmitter 46 (shown in FIG. 1), which communicates through an infrared data port (not shown) of the PC. Similarly, data are typically uploaded to the PC from Nomad through the IR interface. Data can alternatively be downloaded from the PC to Nomad through a paging signal transmission.

Screen Layout

Nomad's display 34 is employed to present bitmapped characters in 8 rows by 17 columns, allowing a substantial amount of information to be viewed at one time. It should be noted that other portable device that include the present invention may user either a larger or smaller display. Although not shown in FIG. 1, above the display area of Nomad are a row of icons indicating other aspects of the device, and on the left-hand side of the display area may be one or two auxiliary icons resembling up and down arrows. These arrow icons are used to indicate that lines of items are available above and/or below the lines currently shown on the display. Specifically, the up arrow icon indicates that hidden lines exist above the visible text, and the down arrow icon indicates hidden lines exist below the visible text.

Navigation and Menu Support

Navigation on Nomad is done with hierarchical menus, enabling the user to move through a tree structure. FIG. I illustrates the Main Menu on display 34. The first line of a menu may be its title (" MAIN MENU " in this case). The menu title is in upper case and is set off with asterisks to visually distinguish it from the other items in the menu. The title is optional—the software used to load the data into Nomad (executed on the PC) enables the user to choose to include a title or not.

The user moves a selection line (which causes the line to appear in reverse video on the display) up and down to select a desired list item. When the selection line is at the bottom and the down arrow icon is showing on the display, the next Down button push scrolls the list up one line, keeping the selection line at the bottom. When the selection line is on the last list item, the down arrow icon is no longer displayed, and additional Down button pushes do nothing. The analogous process applies to the Up button. The title line is never selectable, but it scrolls off the screen as if it were just another list item, as depression of the Down button moves the selected line below the original bottom line displayed. These same rules normally apply when applets are being executed on Nomad that display information to the user.

Applet Structure

Figure 3:
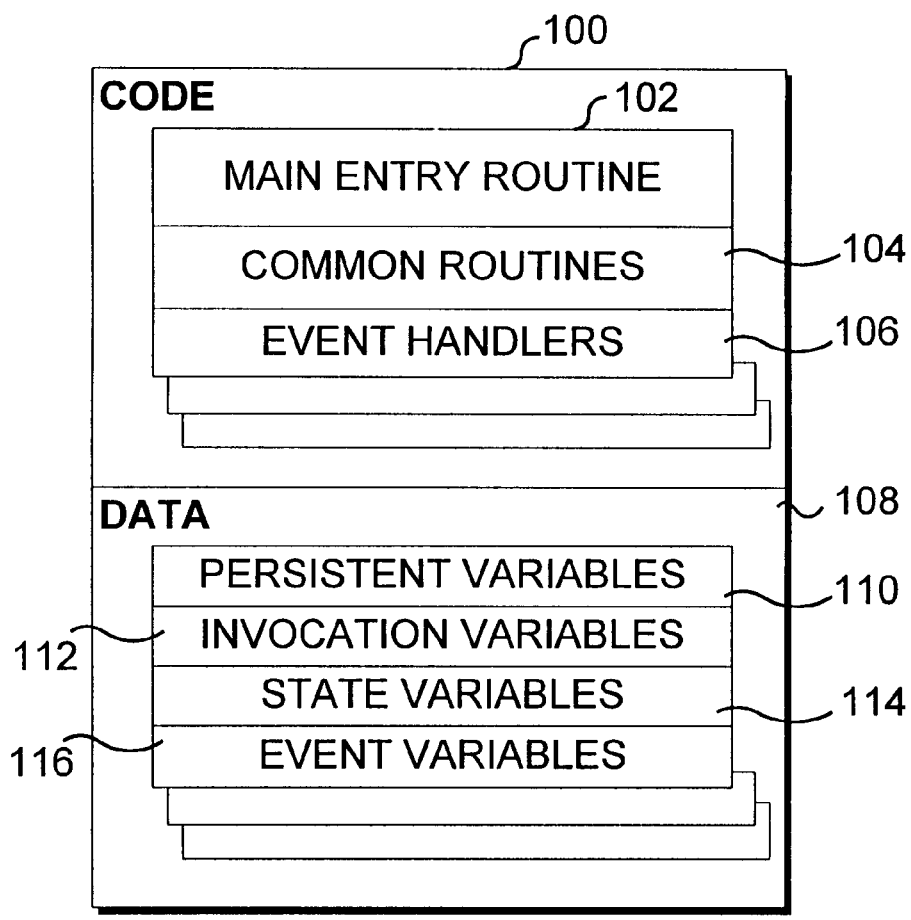
FIG. 3 is a schematic block diagram illustrating sections of memory used by an applet executing on Nomad.

To facilitate executing an applet in the limited 1–2 Kbytes of RAM available, the applet is divided into several sections. An exemplary code section 100 illustrated in FIG. 3 includes a main entry routine 102. This routine is the first one executed when the applet is invoked for execution by CPU 50 in Nomad. The main purpose of main entry routine 102 is to carry out predefined tasks, such as displaying a sign-on banner, before any events are processed by the applet. Accordingly, it might be considered as an initial event handler.

Code section 100 also optionally includes common routines or code section 104. The common routines are a set of routines that are called by two or more event handlers when the applet is executed. By using common code wherever possible, repetition in the p-code comprising an applet is avoided. For example, an appointment applet may have a common routine entitled ShowNextAppt( ), which is called by several event handlers. Accordingly, this common routine would be part of the common code section. Furthermore, the code section 106 of an applet can support multiple sets of common routines to further reduce RAM requirements. These sets can be organized on a per state or per event handler basis. Alternatively, the sets can be appropriately defined as specified by the applet developer.

Another type of software component in the code section of the applet is event handlers 106. Each applet is designed as a state machine intended to handle specific events occurring in each different state using an appropriate event handler. Events include internal operating system/code related occurrences, such as a timer counting a predefined time interval, and user input actions, such as control button actuation. Thus, an event handler can be assigned to the Up button so that when the user depresses the Up button during the running of an applet, that Up button event handler is called to carry out a predefined action in response thereto.

Similarly, a Down button event handler may be assigned to handle each user actuation of the Down button. Because differences exist between the way that different event handlers respond to the corresponding event that initiates them, each event handler is a separate code section, and each such code section may include routines that are called only by that specific event handler.

A data section 108 includes another set of software components that are loaded in the RAM. The software components or modules that are loaded into the data section can all have initial values (except for event variables 116). Data section 108 includes persistent variables that are preserved across invocations of the applet. Since the persistent variables are retained in non-volatile memory, they are continually available for use by p-code language constructs. Also loaded into the data section are invocation variables 112. The invocation variables are stored in RAM during the entire execution of an applet and are retained when an applet changes from one state to another, but are lost when an applet terminates.

State variables 114 are stored in RAM during a specific state of the applet, but are replaced by a new set of state variables when the applet changes state. Since it is possible for an applet to process a number of different events before changing its state, these variables tend to have a longer life within the RAM than the event variables do.

As noted previously, event variables 116 are only available in RAM during processing of a specific event. These variables are replaced by a new set of event variables when a different event must be processed. Accordingly, the event variables include the local variables of routines that are defined within the same event handler section and within the common code or routines.

An example showing how p-code components or modules are loaded into RAM during different states of applets A and B is provided in FIGS. 4A, 4B, and 4C. In FIG. 4A, a first state 130 for applet A is illustrated in regard to the blocks of RAM that are allocated to the different portions of code and data. A block 134 includes the common routines for applet A, which comprise the code that will be called by two or more different event handlers. Invocation variables are retained in a block 136 and are preserved across invocations of different states, during the entire time that the applet is executing. While applet A is in state 1, a block 140 includes variables identified as state A1 variables that will be used during that state, but will be lost and replaced by a new set when the applet changes states.

In state 1, applet A is executing an event handler identified as A1–E4, which is loaded into a block 144 within an event handler area 142. Since the operating system kernel on Nomad is aware of the maximum size of the state variables for this applet in all of its states, the kernel allocates sufficient space in RAM for the state variables that will be required for the applet at start time. Furthermore, a sufficiently large event handler area 142 is allocated in RAM to hold any of the event handlers for any of the applets that can be run on Nomad. All of the software components comprising applet A (other than those placed in the event handler area 142) are thus sequentially loaded into a portion 132 of the RAM that is initially allocated to applet A when it is first executed.

In FIG. 4B, the software components or modules comprising applet A are shown after the applet has changed to a second state A2, as indicated by reference numeral 130'. Although portion 132 of RAM that has been allocated for applet A remains unchanged, it should be noted that state A2 variables, which are stored in a block 140', now occupy a larger part of portion 132 than the variables for state A1 previously did. With the transition to state A2, an event handler A2–E2 and its associated variables are loaded into a block 144' in event handler area 142 of the RAM. No other changes have occurred upon the transition to second state A2, and the persistent variables and invocation variables remain unchanged, as do the common routines.

In FIG. 4C, a third state 130" is illustrated in which an applet B has been initiated. Applet B includes common routines in a block 148 and state B1 variables in a block 152, all of which are allocated to a portion 146 of the RAM. It should be noted that in event area 142 of the RAM, an event handler designated B1–E4 in a block 154 has replaced the event handler previously implemented by applet A. Applet A remains in portion 132 of RAM, since it is not yet terminated.

An applet's footprint in the RAM is equal to the sum of the bytes in the common routines section, the persistent variables section, the invocation variables section, and the largest state variable section required by the applet. Most applets do not have a persistent variables section. The total applet footprint in memory is relatively small, because only two to three variable sections per applet and only one event handler of the currently active applet are loaded into the RAM at any one time. The code for an applet having a multitude of states, where each state has a number of event handlers, can be relatively large (compared to applets having only a few states/event handlers). However, the memory footprint of an applet remains very small. In the current design for Nomad, an applet is typically about 2 Kbytes in size, but its maximum memory footprint is typically less than 150 bytes. Considering the complexity of the functions that can be performed by an applet, the small size of the p-code defining each applet and the limited amount of RAM required to execute an applet are rather remarkable.

The software components comprising each applet are stored as p-code within the non-volatile read/write memory of Nomad. The operating system kernel stored in the ROM of Nomad serves as a p-code interpreter so that the p-code hexadecimal values that are loaded into RAM are appropriately interpreted, producing machine language instructions that are executed by CPU 50. In the preferred embodiment of the present invention, only about 20 kilobytes in ROM are required for storing the kernel that serves as the p-code interpreter. By using relatively compact p-code instructions, the size of the applet software components loaded into RAM during execution of an applet is greatly reduced compared to directly loading machine language instructions from non-volatile memory for execution by the processor.

Example of Applet Source Code

The following section illustrates a few lines of source code extracted from an applet written for Nomad. This source code is written in a Nomad Macro Language, which is a high level language developed for this purpose. The specific type of high level language used to write applets for Nomad is not particularly relevant to the present invention, since it will be apparent that almost any type of high level language such as Microsoft's VISUAL BASIC™ or VISUAL C$^{++}$ could be used instead. The following brief example of source code defines an applet state to process an "option 1," where each press of the Up/Down button on the keypad of Nomad will respectively increment or decrement a counter, producing a count that appears on Nomad's display 34.

```
State State_Option1Processing
    EVENT E_STATE_ENTRY: StateEntry
        Sub StateEntry(UINT8 Ecode, UINT8 ExtraInfo)
            DispCounter()
        End Sub
    End EVENT
    EVENT KEY_NEXT_PRESS, KEY_PREV_PRESS: IncrementDecrement
        Sub IncrementDecrement(UINT8 Ecode, UINT8 ExtraInfo)
            if (Ecode == KEY_NEXT_PRESS) then
                ++Counter
            else
                --Counter
            endif
            DispCounter()
        End Sub
    End EVENT
    EVENT KEY_RETURN_PRESS: GetOut
        Sub GetOut(UINT8 Ecode, UINT8 ExtraInfo)
            Exit(0)
        End Sub
    End EVENT
End State
```

In the preceding source code, it will be apparent that reference is made to other sections of source code that are not included in the example. However, this example helps to illustrate how the source code indicates a state and identifies events and event handlers such as EVENT KEY_RETURN_PRESS that process those events.

Corresponding Example of P-Code

After writing an applet in a high level source code on a PC, the source code statements are processed by a software converter that produces corresponding p-code, with comments. It should be noted that the actual p-code stored in the non-volatile read/write memory of Nomad consists of only the hexadecimal values shown in the left column of the following example. All of the comments and other extraneous data are stripped from the p-code listing shown below before it is uploaded to Nomad for storage in the non-volatile read/write memory. In this manner, the size of the p-code defining an applet is kept relatively small.

The p-code (with comments) corresponding to the above exemplary source code is as follows.

| Offset | Pcodes | ;LineNum comment/source line |
|---|---|---|
| | | ;+60: //--State to process option 1------------------ |
| | | ;+61:     // Processes Up/Down key to increment/decrement a counter and |
| | | ;+62: // displays it |
| | | ;+63: State State_Option1Processing |
| | | ;# StateId = State_Option1Processing StateNum = 1 |
| | | ;# State_Option1Processing |
| | | ;+64:     EVENT E_STATE_ENTRY: StateEntry |
| | | ;# >>EventHandler for EventCode=0x12 |
| | | ;+65:     Sub StateEntry(UINT8 Ecode, UINT8 ExtraInfo) |
| | | ;# StateEntry |
| 0059 00 | | ;* |
| | | ;# Ecode |
| | | ;# ExtraInfo |
| | | ;+66:             DispCounter() |
| 005A A1 00 | | ;! CALL DispCounter |
| | | ;+67:         End Sub |
| 005C A2 | | ;! RET |

| Symbol | Type | Area | Sz/Value | Addr |
|---|---|---|---|---|
| ExtraInfo | DATA | STACK_SPAC | 1 | 0x0001 |
| Ecode | DATA | STACK_SPAC | 1 | 0x0000 |
| | ;+68: | End EVENT | | |
| | ;+69: | | | |

| Symbol | Type | Area | Sz/Value | Addr |
|---|---|---|---|---|
| StateEntry | CODE | EVAR_SPACE | 4 | 0x0000 |

;+70:     EVENT KEY_NEXT_PRESS, KEY_PREV_PRESS:
IncrementDecrement
;# -------EventHandler HeaderStart--------------------------
;# >>EventHandler for EventCode=0x01
;# >>EventHandler for EventCode=0x07
;+71:     Sub IncrementDecrement(UINT8 Ecode, UINT8
                    ExtraInfo)
;# IncrementDecrement
0061 00     ;*
;# Ecode
;# ExtraInfo
;+72:                if (Ecode == KEY_NEXT_PRESS) then
0062 A3     ;! FETCH Ecode
0063 A4     ;! FETCH KEY_NEXT_PRESS
0064 A5     ;! OPR_EQ
0065 A6 00  ;! IF_FALSE_GOTO_EndOfThen2
;+73:                                    ++Counter
0067 A7 00  ;! ++Counter
;+74:                else
0069 A8 00  ;! GOTO_EndOfElse2
;+75:                                    --Counter
006B A9 00  ;! --Counter
;+76:                endif
;+77:               DispCounter()
006D AA 00  ;! CALL DispCounter
;+78:           End Sub
006F AB     ;! RET

| Symbol | Type | Area | Sz/Value | Addr |
|---|---|---|---|---|
| __EndOfElse2 | CODE | EVAR_SPACE | 0 | 0x000C |
| __EndOfThen2 | CODE | EVAR_SPACE | 0 | 0x000A |
| ExtraInfo | DATA | STACK_SPAC | 1 | 0x0001 |
| Ecode | DATA | STACK_SPAC | 1 | 0x0000 |

;+79:     End EVENT
;+80:

| Symbol | Type | Area | Sz/Value | Addr |
|---|---|---|---|---|
| IncrementDecrement | CODE | EVAR_SPACE | 15 | 0x0000 |

;+81:     EVENT KEY_RETURN_PRESS: GetOut
;# -----EventHandler HeaderStart--------------------
;# >>EventHandler for EventCode=0x03
;+82:               Sub GetOut(UINT8 Ecode, UINT8 ExtraInfo)
;# GetOut
0074 00     ;*
;# Ecode
;# ExtraInfo
;+83:                Exit(0)
0075 B1     ;! FETCH 0
0076 B2 00  ;! Exit
;+84:           End Sub
0078 B3     ;! RET

| Symbol | Type | Area | Sz/Value | Addr |
|---|---|---|---|---|
| ExtraInfo | DATA | STACK_SPAC | 1 | 0x0001 |
| Ecode | DATA | STACK_SPAC | 1 | 0x0000 |

;+85:     End EVENT

| Symbol | Type | Area | Sz/Value | Addr |
|--------|------|------|----------|------|
| GetOut | CODE | EVAR_SPACE | 5 | 0x0000 |

Data Exchange System and PC Executed Software (Proteus)

The software developed to download applets to Nomad and to facilitate other data exchange between Nomad and the PC (and also used to initially setup Nomad) is currently referred to by the project name "Proteus." This software is executed on the PC to permit data to be exchanged between Nomad and the PC. FIG. 5 is a block diagram that illustrates components 230 that are used for exchanging PIM data, applets, and other data between the PC and Nomad device. A Proteus repository and Send Manager 232 serves as the control for any data exchange. Microsoft Corporation's SCHEDULE+™PIM (or other PIM software) can serve as the source of data that are to be downloaded into Nomad, as indicated in a block 234. If the SCHEDULE+PIM software is the source of the PIM data, a block 236 indicates that a Wizard is provided in this software to facilitate the PIM data download operation, assisting the user in selecting specific portions of the PIM data that are to be downloaded. A block 238 provides a "grabber" for conveying data bidirectionally between the PIM software and the Proteus control software.

In addition to PIM software applications, database software applications and other applications can exchange data with Nomad, as indicated in a block 240. The other applications are coupled to the Proteus control through ISV provided interface software, as noted in a block 242. Also preferably coupled to the Proteus control are a Page archiver 244, a list editor 246 that is used for editing lists (such as To Do lists), a customizer 248, and an E-mail interface software block 262. The customizer permits options to be selected that customize the operation of Nomad.

A synchronizer block 250 is used for synchronizing data stored in Nomad 254 and in the Proteus Repository via transmissions over an IR port 252. Also coupled to the control is an object maker 256, which is set up to provide paging objects that can be used to edit or update data within Nomad. As explained above, such objects can be transmitted as a page over conventional pager RF channels. A modem interface 258 couples the object maker to modem hardware 260, so that the object can be conveyed over the phone lines to a paging transmitter (not shown) and transmitted by radio to Nomad. Also coupled to the object maker is a network interface 266, which provides communication to other computers (not required in the present invention) that are connected in a local area network (LAN) 268. A page and object sender is also directly coupled to object maker 256, bypassing the Proteus Repository and Send Manager. Applets developed for execution by Nomad can be sent to the device as page objects or downloaded via the infrared data link. Once stored in the read/write memory on Nomad, the applets can be executed under the control of the user. By executing an applet, the basic functionality of Nomad (or any other small portable device in which the present invention is embodied) can be substantially altered and thus expanded. Accordingly, the useful life of the device is extended by providing appropriate applets to enhance its functional capabilities. For example, if embodied in a cell phone that when originally sold, did not include the ability to provide caller identification (ID), an appropriate applet executed by a processor in the cell phone could provide that additional caller ID functionality. The purchaser of the cell phone would then not feel compelled to buy a new cell phone in order to be enjoy the caller ID function.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for executing a software application in a random access memory of an integral portable system having a processor and a permanently resident operating system, so as to limit a random access memory capacity required while the processor executes the software application, comprising the steps of:

(a) providing application code for a single application that is divided into specific software components, said software components including variables and an event handler;

(b) designating a first portion of the random access memory to contain variables and any common routines, and designating a second portion of the random access memory as an event handler area, and from a storage memory included in the integral portable system that is not used for execution of the application, under control of the permanently resident operating system, loading into the first portion of the random access memory only the variables and into the second portion of the random access memory, any event handler for the software application, which are required in executing at least one function of the application, said random access memory having a capacity that is less than that required to load all of the software components for the application, said storage memory having stored therein all of the software components for the application;

(c) executing the software components that have been loaded into the random access memory using the processor;

(d) detecting a change in a state of the system and a new event with the processor, while the processor is executing the software components loaded into the random access memory; and (e) in response to either the change in the state of the system or the new event, and under the control of the permanently resident operating system, loading another software component into the random access memory from the storage memory to replace at least one of the software components previously stored therein, for execution by the processor and repeating steps (c) through (e) until execution of the software application is terminated.

2. The method of claim 1, wherein the variables include at least one of:

(a) a persistent variable that is stored between invocations of the software application;

(b) an invocation variable that is stored in the random access memory during execution of the software application and retained between changes in state of the system, but is lost when the software application terminates;

(c) a state variable that is stored in the random access memory during a specific state of the software application, but is replaced when a state of the system changes; and (d) an event variable that is stored in the random access memory while an event is being processed, but is replaced by a different event variable when a different event must be processed.

3. The method of claim 2, wherein any of the variables except the event variable are able to have an initial value when loaded into the random access memory.

4. The method of claim 2, wherein:

(a) if a new event occurs while the system has not changed state, the event variable and an event handler for the new event are loaded into the random access memory, replacing a previously loaded event variable and event handler; and (b) if a new event occurs when the system has changed state, the state variable, the event variable, and the event handler for the new event are loaded into the random access memory, replacing a previously loaded state variable, event variable, and event handler.

5. The method of claim 1, wherein an operating system kernel specifies an order in which the variables are loaded into the random access memory during execution of the software application by the processor, so as to ensure that required software components are loaded when needed, an minimizes overall memory usage so that a maximum number of applets can be concurrently executed.

6. The method of claim 1, wherein a main entry routine is initially executed by the processor when execution of the software application is invoked by the user, said main entry routine implementing at least one task before an event is processed by the processor.

7. The method of claim 1, wherein the software components include a common code that comprises at least one routine executed by a plurality of different event handlers loaded into the random access memory at different times while the software application is being executed by the processor.

8. The method of claim 1, wherein only a portion of the random access memory is used for storing software components that comprise the software application.

9. The method of claim 1, wherein the software application comprises a pseudo-code that is interpreted by the processor when loaded into the random access memory, said pseudo-code being substantially smaller than corresponding machine language instructions and being processor independent.

10. An integral portable system for executing a software application in a limited memory environment, comprising:

(a) a processor that executes application code comprising the software application, said application code having a plurality of software components;

(b) a storage memory included in the integral portable system for storing all of the application code until invoked by a user of the integral portable system and for storing machine language instructions, including machine language instructions of a permanently resident operating system, that determine how the processor interprets and processes the application code, said storage memory not being used for storing the application code when executed by the processor;

(c) a volatile memory included in the integral portable system and having a storage capacity smaller than that required to hold all of the application code comprising the software application and substantially smaller than a storage capacity of the storage memory; and (d) said processor responding to the machine language instructions by:

(i) loading into the volatile memory from the storage memory, only those portions of the software components required to perform a single step in a process leading to completion of at least one function of the application, wherein the loading of said portions of the software components is under control of the permanently resident operating system;

(ii) executing the software components that have been loaded into the volatile memory;

(iii) detecting a change in a state of the system and a new event with the processor while the processor is executing the software components loaded into the volatile memory; and (iv) in response to either the change in the state of the system or the new event, loading another software component into the volatile memory from the storage memory for execution by the processor, and repeating steps (d)(ii) through (d)(iv) until execution of the software application is terminated.

11. The system of claim 10, wherein the software components comprise variables that include at least one of:

(a) a persistent variable that is stored between invocations of the software application;

(b) an invocation variable that is stored in the volatile memory during execution of the software application and retained between changes in state of the system, but is lost when the software application terminates;

(c) a state variable that is stored in the volatile memory during a specific state of the software application, but is replaced when a state of the system changes; and (d) an event variable that is stored in the volatile memory while an event is being processed, but is replaced by a different event variable when a different event must be processed.

12. The system of claim 11, wherein any of the variables except the event variable are able to have an initial value when loaded into the volatile memory.

13. The system of claim 11, wherein:

(a) if a new event occurs while the system has not changed state, the event variable and an event handler for the new event are loaded into the volatile memory, replacing a previously loaded event variable and event handler; and (b) if a new event occurs when the system has changed state, the state variable, the event variable, and the event handler for the new event are loaded into the volatile memory, replacing a previously loaded state variable, event variable, and event handler.

14. The system of claim 10, wherein the software application includes a kernel software component that specifies an order in which software components are loaded into the volatile memory during execution of the software application by the processor, so as to ensure that required software components are loaded when needed, but that the storage capacity of the volatile memory is not exceeded.

15. The system of claim 10, wherein a main entry routine is initially executed by the processor when execution of the software application is invoked by the user, said main entry routine implementing at least one task before and event is processed by the processor.

16. The system of claim 10, wherein the software components include a common code that comprises at least one routine executed by a plurality of different event handlers loaded into the volatile memory at different times while the software application is being executed by the processor.

17. The system of claim 10, wherein only a portion of the volatile memory is used for loading software components that are executed by the processor when executing the software application.

18. The system of claim 10, further comprising a housing in which the system is enclosed, said housing being sufficiently small and compact to enable it to be readily portable.

19. The system of claim 10, further comprising a display on which text and graphics produced by the software application are presented to the user.

20. The system of claim 10, wherein the storage memory comprises a read/write memory and a read only memory, said machine instructions being stored in the read only memory.

21. The system of claim 10, wherein the system is embodied in a relatively small, portable device having a defined functionality, and wherein the functionality of the device is substantially altered by the software application executed by the processor.

22. A limited resource computing device controlled by a permanently resident operating system, comprising:
   (a) a processor;
   (b) a first memory in which a complete application is stored, the complete application including a plurality of components that are capable of performing at least one function of the application when executed by the processor, said plurality of components including any common routines, variables, and event handlers required in executing said at least one function; and
   (c) a second memory having a substantially smaller storage capacity than the first memory, the second memory including a first portion that is designated for loading any common routines and variables of the application, and a second portion that is designated as an event handler area, said first portion of the second memory, under control of the permanently resident operating system, being loaded only with any common routines and variables and said second portion, under control of the permanently resident operating system, being loaded only with any event handler required in executing said at least one function, irrespective of whether the components that are thus loaded into the second memory are capable of performing all steps required to complete said at least one function of the application when executed by the processor.

23. The limited resource computing device of claim 22, wherein a different component is loaded into the second memory in response to either a change in a state of the limited resource computing device or a new event occurring.

24. The limited resource computing device of claim 23, wherein if a new event occurs before a change of state, an event variable and an event handler for the new event are loaded into the second memory, and if a new event occurs when a change of state has occurred, a state variable, the event variable, and the event handler for the new event are loaded into the second memory.

25. The limited resource computing device of claim 22, wherein the application includes a kernel software component that specifies an order in which the components are loaded into the second memory for execution of the application by the processor, so as to ensure that required components are loaded when needed, that only the minimally required components are present in the second memory at one time, and that the storage capacity of the second memory is not exceeded.

26. The limited resource computing device of claim 22, wherein a main entry routine is initially executed by the processor when the application is executed, said main entry routine implementing at least one task before an event is processed by the processor.

27. The limited resource computing device of claim 22, wherein the components include a common code that comprises at least one routine executed by a plurality of different event handlers loaded in the second memory at different times while the application is being executed by the processor.

28. A method for executing a plurality of software applications on a system having a processor and a permanently resident operating system, so as to limit a random access memory capacity required while the processor executes the software applications, only one of which is in an active state at a time, comprising the steps of:
   (a) providing application code for each of the software applications that is divided into specific software components, such that each software component is smaller than the random access memory capacity, and so that each software component when executed performs a single step in a process that leads to the completion of at least one function of one of the software applications;
   (b) from a storage memory that is included in the system but is not used for execution of the software applications, and under control of the permanently resident operating system, loading into a random access memory that is included in the system, software components for at least one of the software applications selected from among the plurality of software applications, said software components that are loaded into the random access memory being required to perform a first sequential step in said at least one of the software applications, including a software application that is currently in an active state, said storage memory having a capacity to store all of the software components for said at least one of the software applications, and said random access memory having a capacity that is less than that required to load all of the software components for said at least one of the software applications into the random access memory at a single time;
   (c) executing the software component in the random access memory for the software application that is currently in an active state using the processor;
   (d) flushing any software component in the random access memory that has been executed, and loading into the random access memory one or more different software components for a selected software application that is currently in an active state, said different software component being required to perform a step in the selected software application; and
   (e) repeating steps (c) through (e) as the software applications selected from among the plurality of software applications are successively put into an active state, until execution of the software applications is terminated.

29. The method of claim 28, wherein the system is a state machine, and the software components further comprise variables and an event handler.

30. The method of claim 29, wherein the variables include at least one of:
   (a) a persistent variable that is stored between invocations of the software application;
   (b) an invocation variable that is stored in the random access memory during execution of the software application and retained between changes in state of the system, but is lost when the software application terminates;

(c) a state variable that is stored in the random access memory during a specific state of the software application, but is replaced when a state of the system changes; and (d) an event variable that is stored in the random access memory while an event is being processed, but is replaced by a different event variable when a different event must be processed.

31. The method of claim 28, wherein the software components further comprise a common code that includes at least one routine executed by a plurality of different event handlers loaded into the random access memory at different times while the software applications are being executed by the processor.

32. The method of claim 31, wherein the software components are written in a compact format, to minimize the random access memory required for execution of each component.

33. The method of claim 28, wherein the system is portable.

34. The method of claim 28, wherein each of the software applications comprises a pseudo-code that is interpreted by the processor when loaded into the random access memory and executed, said pseudo-code being substantially smaller than corresponding machine language instructions and being processor independent.

* * * * *